United States Patent

Belcastro et al.

[11] Patent Number: 5,232,079
[45] Date of Patent: Aug. 3, 1993

[54] ARTICLE TRANSFER REJECTION APPARATUS AND METHOD

[75] Inventors: Marc D. Belcastro, Glen Allen; Donald H. Jones, Chesterfield; H. Cary Longest, Midlothian, all of Va.

[73] Assignee: Philip Morris Incorporated, New York, N.Y.

[21] Appl. No.: 884,741

[22] Filed: May 15, 1992

[51] Int. Cl.⁵ .................................................. B65G 47/46
[52] U.S. Cl. ...................................... 198/372; 198/438; 209/535
[58] Field of Search ............. 198/372, 471.1, 438, 198/493; 209/535, 918; 131/282

[56] References Cited

U.S. PATENT DOCUMENTS

| | | | |
|---|---|---|---|
| 2,246,107 | 6/1941 | Ruau | 209/79 |
| 3,270,551 | 9/1966 | Schmalz | 73/38 |
| 3,348,552 | 10/1967 | McCarthy et al. | 131/94 |
| 3,363,632 | 1/1968 | Gamberini | 131/94 |
| 3,372,702 | 3/1968 | Bohn et al. | 131/94 |
| 3,377,843 | 4/1968 | Rudszinat | 73/45.2 |
| 3,426,583 | 2/1969 | McArthur et al. | 73/45.1 |
| 3,483,873 | 12/1969 | Hinzmann | 131/23 |
| 3,491,767 | 1/1970 | Kaeding | 131/21 |
| 3,520,177 | 7/1970 | Heitmann et al. | 73/45.1 |
| 3,618,365 | 11/1971 | McArthur | 73/45.1 |
| 3,665,930 | 5/1972 | Giatti | 131/21 R |
| 4,004,593 | 1/1977 | Kaeding et al. | 131/21 R |
| 4,037,608 | 7/1977 | Wahle | 131/21 B |
| 4,175,479 | 11/1979 | Roullier | 93/77 FT |
| 4,235,330 | 11/1980 | Zausch et al. | 198/480 |
| 4,262,680 | 4/1981 | Hinzmann | 131/94 |
| 4,277,678 | 7/1981 | Wahle et al. | 250/223 |
| 4,284,198 | 8/1981 | Koch | 209/537 |
| 4,391,372 | 7/1983 | Calhoun | 209/523 |
| 4,452,255 | 6/1984 | Brand | 131/282 |
| 4,484,591 | 11/1984 | Wahle et al. | 131/280 |
| 4,574,646 | 3/1986 | Mattei et al. | 73/863.92 |
| 4,582,201 | 4/1986 | Taniguchi et al. | 209/587 |
| 4,719,927 | 1/1988 | Barbe | 131/94 |
| 4,825,994 | 5/1989 | Gomann et al. | 198/370 |
| 4,886,077 | 12/1989 | Hinzmann et al. | 131/282 |
| 4,962,771 | 10/1990 | Neri et al. | 131/282 |

Primary Examiner—Joseph E. Valenza
Attorney, Agent, or Firm—Mitchell P. Brook; Jeffrey M. Hersh

[57] ABSTRACT

An apparatus and method for selectively removing articles, such as cigarettes, from a transfer conveyor system in which the transfer of the selected articles to a receiver conveyor from a transfer conveyor is rejected within a transfer zone. Vacuum suction retaining articles on the transfer conveyor is blocked in the transfer zone as articles pass to the receiver conveyor. Transfer of selected articles is rejected by application of an air pulse responsive to a reject signal. The selected articles are returned to the transfer conveyor, from which they are removed.

34 Claims, 2 Drawing Sheets

ARTICLE TRANSFER REJECTION APPARATUS AND METHOD

BACKGROUND OF THE INVENTION

The present invention relates generally to an apparatus and method for removing selected articles, such as cigarettes, from a conveyor pathway during manufacturing or processing operations.

In known cigarette manufacturing operations, cigarettes typically are processed and transported on processing drums. Cigarettes are positioned in flutes that are axially spaced along the periphery of the processing drums, which rotate about stationary valve members. The cigarettes are held in place in the flutes by vacuum suction conveyed to the flutes through conduits. These conduits extend radially inward from the flutes to a vacuum chamber. A vacuum generator provides the vacuum suction to the vacuum chamber through the stationary valve member. The force of the vacuum suction is sufficient to hold the cigarettes in position on the flutes, overcoming the combined forces on the cigarettes of gravity and the centrifugal force from the rotating conveyor.

Cigarettes are transferred from one processing drum to another at a transfer point, which generally is the point at which the two processing drums are closest together. At the transfer point a flute on one drum is adjacent to a flute on the other drum.

It is known to transfer cigarettes from one drum to another by a vacuum transfer system, such as that used in the MAX S filter tipping machine, which is manufactured by Hauni-Werke Korber & Co. KG, Hamburg, Germany. In such a vacuum transfer system, the vacuum suction applied to the flute on the transfer drum is blocked just as the flute reaches the transfer point. Centrifugal forces due to the transfer drum rotation and vacuum suction from the adjacent flute on the receiving drum combine to overcome the gravitational force and residual vacuum suction, if any, that remains in the flute on the transfer drum, thereby causing transfer to the receiving drum.

For quality control in cigarette manufacturing and processing, it is desirable to select and remove cigarettes from the processing drum transport pathway—either to eliminate defective cigarettes or for testing. One known scheme for selectively removing cigarettes is air-jet ejection.

In the air-jet ejection scheme, a defect detection device or other trigger-determining mechanism causes a signal to trigger an air-jet device to eject a selected cigarette from the processing drum. The air jet device shoots a high-pressure pulse of air (typically at 60-180 psi) through a conduit, which jettisons the selected cigarette off the flute.

It is a disadvantage of the air-jet scheme that the force of the air jet must be sufficiently strong to overcome the vacuum suction, but must be applied with a sufficiently short pulse such that the vacuum suction returns before the next flute rotates to the position adjacent to the air jet. It is a related disadvantage that frequent maintenance typically is required to use the air-jet scheme at the high speeds typical in modern cigarette processing machines.

It is a further disadvantage that a delicate balance is required to produce high pressure that quickly dissipates. This requires typically expensive triggering and timing devices.

It is another disadvantage of the air-jet scheme that the high pressure of the air stream required to overpower the vacuum suction can damage the selected cigarette, hampering the analysis of the cause of defects in the cigarette, or defeating quality control sampling.

It is yet another disadvantage of the air-jet scheme that cigarettes can be ejected in unpredictable trajectories, which can cause the selected cigarettes to miss the collecting receptacle.

Another known scheme for selectively removing cigarettes from processing drums is selective transfer blocking, such as taught in Brand U.S. Pat. No. 4,452,255, issued Jun. 5, 1984. In the selective transfer blocking scheme, acceptable cigarettes are transferred from one drum to another while transfer of defective cigarettes is blocked. Transfer is blocked by turning on a suction generator in the transferor drum inducing suction on the defective cigarette at the transfer point while simultaneously shooting a compressed air from the receiving drum in order to further reduce the likelihood of transfer of the defective cigarette. Transfer is accomplished by providing ambient air pressure to the cigarette to be transferred in the transferor drum while maintaining a suction force in the receiving drum.

The selective transfer blocking scheme has a disadvantage of requiring a pulse of high-pressure air to be split into two pipes—a pressure line that releases the air jet to the receiving flute and a pipe that simultaneously causes a vacuum to be pulled at the transfer flute.

SUMMARY OF THE INVENTION

The present invention alleviates to a great extent disadvantages of the prior art by providing an apparatus and method for removing selected articles, such as cigarettes, from a transfer conveyor system, such as preferably a processing drum transport system. Transfer of the selected articles is inhibited through injecting a pulse of air across a vacuum chamber in the receiver conveyor and thereby cancelling suction force that continuously is supplied in the receiver conveyor. The selected article is transferred from a transferor conveyor to a receiver conveyor. Then the selected article is ejected back through application of the pulse of air. At a later point, the selected article is stripped from the transferor conveyor. The transfer inhibition takes place in a transfer zone, which corresponds to an area at which the two conveyors are adjacent to each other.

Referring to the preferred embodiment, a cigarette selected for rejection is momentarily transferred from a first processing drum (the "transferor drum") to a second processing drum (the "receiver drum"). The processing drums preferably have flutes, which cradle and, in cooperation with vacuum suction apparatus, retain the cigarettes in place. Then, in response to a reject signal, the transfer is rejected by injecting a pulse of air, which preferably is a low-pressure pulse, into a conduit that leads to a flute in the second conveyor, which holds the selected cigarette. The air pulse offsets the vacuum suction of the receiving flute at the transfer point. The air pulse used is sufficiently forceful to return the transferred cigarette back to the flute on the first processing drum (the "transfer flute"). The reject signal may be generated by any means, including the system for optically inspecting cylindrical surfaces described in copending, commonly-assigned U.S. application Ser. No. 07/884,746, which is incorporated herein by reference.

The selected cigarette is removed from the first drum by stripper fingers.

It is therefore an advantage of the present invention that transfer of a selected cigarette is inhibited without inhibiting the transfer of cigarettes in adjacent flutes, unless desired.

A further advantage of the present invention is that cigarettes are transferred or rejected as desired without actively turning on and off vacuum application in the transfer drum.

Another advantage of the present invention is a high-pressure air jet is not required for ejection of selected cigarettes.

Yet another advantage of the present invention is that lower pressure air pulses are used than in known transfer denial systems.

It is still a further advantage of the present invention that the preferred embodiment of the present invention uses a relatively low pressure air pulse and a relatively short tube between the valve 30 controlling the air pulse and the air pulse port—thereby providing greater control and consistency in the timing of the compressed air pulse, and producing less residual pressure to be dissipated through the vacuum chamber.

BRIEF DESCRIPTION OF THE DRAWINGS

The above and other objects and advantages of the invention will be more apparent from the following detailed description and the accompanying drawings in which like reference characters represent like elements throughout, and in which.

DETAILED DESCRIPTION OF THE INVENTION

Figure 1:
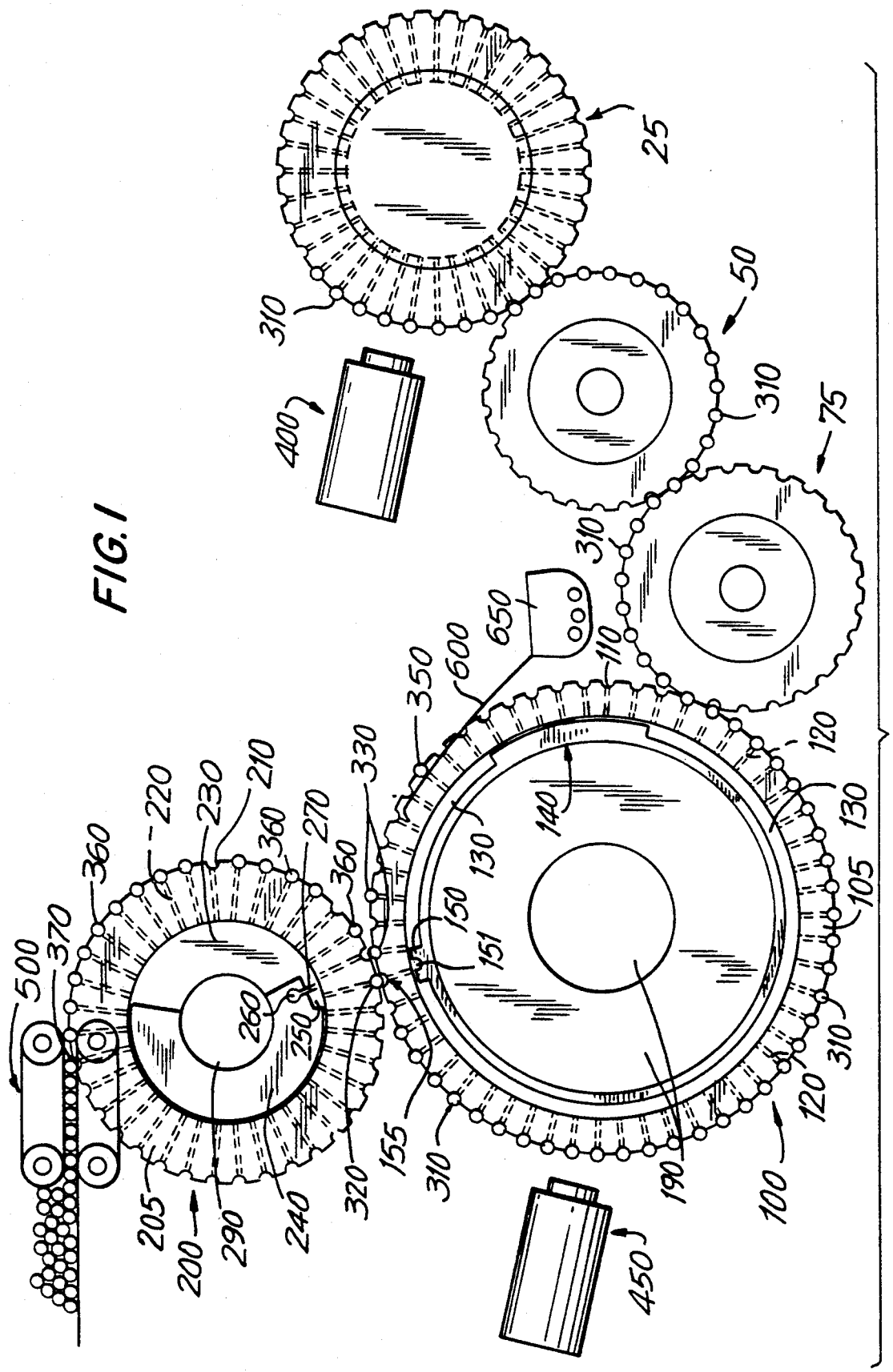
FIG. 1 is an elevational view of an article transfer rejection apparatus constructed in accordance with the present invention.

Selected articles, such as cigarettes in the preferred embodiment, are removed from a transfer conveyor system by rejecting transfer of the selected articles from one conveyor to another. The present invention is particularly adapted for use in a high-speed cigarette processing system employing processing drums, including, without limitation, a transferor drum 100 and a receiver drum 200.

In operation, articles, such as cigarettes (the embodiment discussed hereafter) or cigarette components, are transported in the flutes 110 on the periphery of transfer drum cylinder 105. The transfer drum cylinder 105 is a conveyor that rotates, preferably at a high speed about a stationary valve 190. In the preferred embodiment, the transfer drum cylinder 105 is generally cylindrically shaped such that it fits over and rotates about the stationary valve 190. In the embodiment depicted in FIG. 1, cigarettes 310, 320, 330, 350, 360 are transferred to transfer drum 100 from processing drum 75 and the transfer drum cylinder 105 rotates in a clockwise direction. Any means may be used to rotate transfer drum cylinder 105, such as a motor (not shown). Any number of additional processing drums 25, 50 may be included in the cigarette processing system.

The cigarettes are retained in flutes 110 through suction force transmitted to the flutes 110 through conduits 120 from vacuum chamber 130. The conduits 120 extend radially through the transfer drum cylinder 105. The vacuum chamber 130 is in communication with the stationary valve 190, such as through holes or tubes (not shown), such that vacuum force is transmitted to the vacuum chamber 130. The vacuum chamber 130 provides vacuum force to the conduits 120 for the entire rotation of the transfer drum cylinder 105, except where the vacuum chamber is blocked by vacuum blocks 140, 150.

The transfer drum cylinder 105 preferably rotates at high speeds, such as speeds of over 50 revolutions per minute. At such high speeds, thousands of cigarettes per minute are processed, such as over 5,000 cigarettes per minute. Any amount of vacuum suction force may be applied to cigarettes 300 in flutes 110 such that cigarettes remain in the flutes, viz. exceeding the applicable gravitational and centrifugal forces.

As the transfer drum cylinder 105 rotates in operation, each of the conduits 120 successively pass over vacuum chamber 130, vacuum block 150, vacuum chamber 130 and vacuum block 140. The vacuum blocks 140 and 150 preferably are solid surfaces that are generally impermeable to air. Preferably vacuum blocks 140, 150 are constructed of a metal, such as cast iron. Preferably, at the exterior end of each conduit there is a flute. When a conduit 120 passes over the vacuum chambers 130, vacuum suction is conveyed through the conduit 120 to the corresponding flute 110. When a conduit passes over a vacuum block 140, 150, vacuum suction is cut off.

Figure 2:
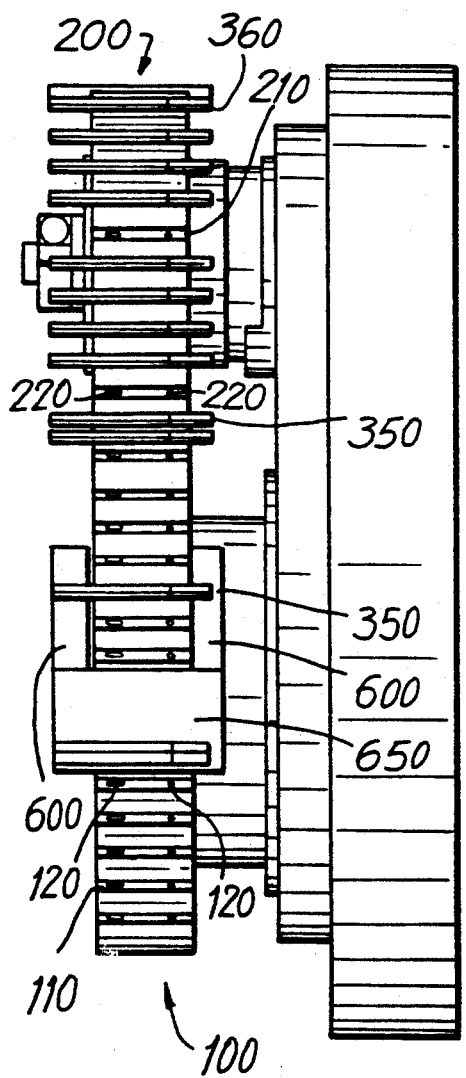
FIG. 2 is a side view of the transfer and receiving drums of FIG. 1.

Flutes 110 are axially positioned along the periphery of transfer drum 100. Each flute 110 preferably is adapted to cradle one cigarette, which is held in place during rotation by vacuum suction conveyed from vacuum chambers 130 through conduits 120. Any number of conduits 120 may convey vacuum suction to a flute 110. In the preferred embodiment depicted in FIG. 2, two conduits 120 lead to each flute 110. Any width of flute may be used. However, in the preferred embodiment, each flute is shorter than the longitudinal length of the cigarettes or other articles being transported, such that the cigarettes 350 overhang the edges of the flutes 110 and conveyor 105. With this overhang, the preferred removal apparatus, discussed below, may be used.

In operation, as the transfer drum cylinder 105 rotates, cigarettes approach the transfer zone. The transfer zone is region at which the transfer drum 100 is adjacent to the next drum in the processing path, which in the embodiment depicted in FIG. 1 is the receiver drum 200. In the transfer drum, the transfer zone corresponds to the location of vacuum block 150. A portion of the transfer zone is the transfer point 155, which is the position at which cigarettes are transferred from the transfer drum 110 to the receiver drum 200. Preferably, the transfer point 155 generally corresponds to area at which the transfer drum 100 is closest to the next drum in the processing path. As cigarettes approach the transfer point 155, vacuum suction to cigarette 320 is cut off by vacuum block 150. The vacuum suction is cut off as conduits 120 are blocked from vacuum chamber 130 by the vacuum block 150. Preferably the outer surface of vacuum block 150 has a relief notch 151, which is vented to the atmosphere, to reduce the residual vacuum suction to cigarette 320 (the cigarette at the transfer point).

Receiver drum 200 is a processing drum, which, like transfer drum 100, preferably has a rotatable receiving cylinder 205 that has flutes 210, conduits 220, stationary valve 290, a vacuum chamber 230 in communication with the stationary valve 290 and a vacuum block 240.

As a cigarette 320 reaches the transfer point 155 and its vacuum suction is cut off, it is transferred to a flute on the receiving cylinder Vacuum suction, supplied to receiver drum flutes at the transfer point 155 through transfer vacuum chamber 250, drawing the cigarette 320 to the receiver drum 200.

If the transferred cigarettes are not selected for rejection, they remain in flutes 210 on the receiver drum (preferably retained in place by vacuum suction) and are transported away. Such non-selected cigarettes are indicated by reference numerals 360 on FIG. 1. In one embodiment, the retained cigarettes 360 continue downstream until they reach conveyor belt 500. The retained cigarettes are held in the receiver drum flutes 210 through vacuum suction supplied through conduits 220 from vacuum source 230. The retained cigarettes 360 can be removed on conveyor belt 500 and transported for further processing, or alternatively can be transferred to another processing drum.

Optionally, the transferred cigarette 320 may be selected for rejection. The cigarette 320 may be selected, for example, for quality control sampling. Alternatively, it may be selected because it is defective. In one embodiment, one or both of defect detection devices 400, 450 detects a defect. One such detection device is the system for optically inspecting cylindrical surfaces described in co-pending, commonly-assigned U.S. application Ser. No. 07/884,746, supra. If a cigarette is selected for rejection, a reject signal is sent to the receiver drum 200 to activate the rejection mechanism. Any type of signal, such as an analog pulse, or a computer-assisted signal may be sent.

The selected cigarette is rejected from its flute on the receiver drum cylinder 205 by a pulse of air from rejection port 270, which is supplied by rejection port conduit 260. The air pulse may be supplied for any duration and at any pressure sufficient to discharge the cigarette 320 and cause it to jump the gap between the receiver drum flute and the adjacent transfer drum flute. In the preferred embodiment, the pulse preferably is supplied for a duration lasting generally two-fifths of the period between cigarettes and at a peak pressure of generally 20 psi. Preferably the air pulse is supplied through the rejection port 270 promptly after the cigarette is transferred to the receiver drum flute 210 such that the cigarette is returned back to the transfer drum flute 110.

The rejection port 270 may optionally inject an air pulse into the conduit through the transfer vacuum chamber 250, or, preferably, through a rejection port 270 adjacent to the transfer vacuum chamber 250 as depicted in FIG. 1. In the preferred embodiment, the rejection port 270 is situated between one and three degrees of rotation of the receiver drum cylinder 205 downstream from the transfer point. Preferably the air pulse is no stronger than necessary to offset the suction force that holds cigarette 320 to flute 210.

Figure 3:
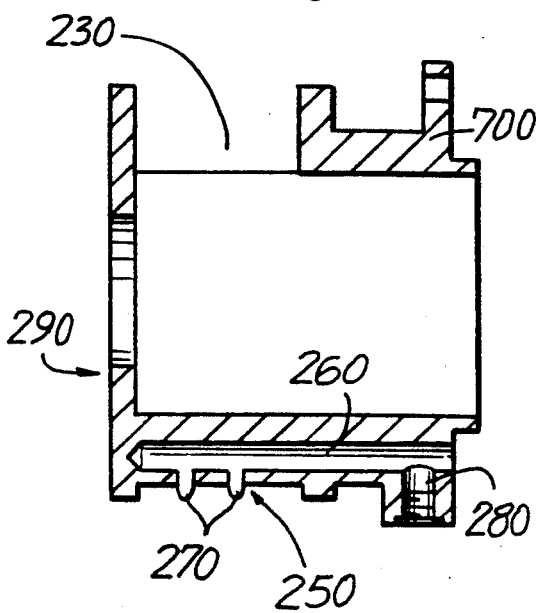
FIG. 3 is a cross-sectional side view of the stationary valve of the receiver drum of FIG. 2.

As shown in FIG. 3, the preferred transfer vacuum chamber 250 has two rejection ports 270 that are connected to conduit 260, which is connected to a compressed air supply 280. The distance from the compressed air supply 280 to rejection ports preferably is minimized in order to better control the air pulse, such as to minimize time delays between triggering the air pulse and shooting it through rejection ports 270 and to minimize air dissipation. In one embodiment the distance is kept under six inches.

In an alternative embodiment, transfer of selected cigarettes is inhibited before they are transferred to the receiver drum 200 from the transfer drum 100. As a selected cigarette reaches the transfer point, an air pulse, responsive to the reject signal is provided from rejection port 270. The rejection port is oriented such that the vacuum provided to the receiver drum flute at the transfer point is overcome and the selected cigarette remains in its flute. For example the rejection port may be aimed directly towards the transfer point, or it may be directed close to the transfer point. Likewise, the air pulse has a sufficient duration and pressure such that the vacuum provided to receiver drum flute at the transfer point is overcome and the selected cigarette 320 remains in its flute on the transfer drum cylinder.

The selected cigarettes, as shown by reference number 330 in FIG. 1, travel downstream on the transfer cylinder 105. They are retained in the flute 110 by the vacuum suction supplied through vacuum chamber 130. The rejected cigarettes 330 continue downstream until being removed. Any removal apparatus may be used. In the preferred embodiment dual removal fingers 600 are used. The removal fingers 600 preferably are generally flat metal strips positioned on either side of conveyor 105 downstream from the transfer point 155. On FIGS. 1-2 a rejected cigarette that is being stripped off the transfer drum conveyor 105 is indicated by reference numeral 350. The vacuum suction preferably remains in full force as removal fingers 600 move cigarette 350 radially outward, away from its flute 110. Preferably the removal fingers 600 are concave, with a radius of curvature greater than that of the transfer drum 100, such that in the downstream direction, the distance from the centerline of transfer drum 100 increases. As the removal fingers 600 ease cigarette 350 away from flute 110 and its suction, the cigarette 350 travels along removal fingers 600 and into rejected cigarette container 650. In an alternative embodiment, The vacuum suction decreases by application of a suction block as fingers move the cigarette 350 radially outward and away from its flute.

Transfer drum 100 and receiving drum 200 preferably are generally coplanar, and at the transfer point 155, the adjacent flutes 110, 210 are spaced about one-half millimeter further apart than the diameter of cigarette 320. Maintaining this proximity between transfer drum 100 and receiving drum 200 is desireable in order to minimize the distance the cigarettes need to travel between the drums.

While the diameter of transfer drum 100 shown in FIG. 1 is greater than the diameter of receiving drum 200, those skilled in the art will appreciate that either of the drums may be larger or smaller, independent of the diameter of the other, provided that in operation, flutes on the transfer drum align with flutes on the receiver drum.

In addition, numerous modifications may be made to the preferred embodiment within the scope of the invention. For example, the transfer drum may rotate counterclockwise with the receiving drum rotating clockwise, or rotated at a faster or slower speed than described herein. Or there may be two selective transfer rejection points, one from a transfer drum to a receiving drum as shown, then from the receiving drum to a subsequent receiving drum.

Thus, it is seen that an apparatus and method for inhibiting transfer of a selected article is provided. One skilled in the art will appreciate that the present invention can be practiced by other than the preferred embodiments, which are presented for purposes of illustration and not of limitation, and the present invention is limited only by the claims that follow.

What is claimed is:

1. An apparatus for selectively rejecting the transfer of discrete articles transferred from a transfer conveyor to a receiver conveyor within a transfer zone, said transfer conveyor and receiver conveyor being adjacent to each other within the transfer zone, the transfer conveyor comprising:

a first stationary valve;
   a first rotatable conveyor that is rotatably mounted to the first stationary valve;
   a first plurality of article supporting members spaced apart on the first rotatable conveyor; and
   a first vacuum chamber in communication with the stationary valve, said vacuum chamber being adapted to provide suction to the first plurality of article supporting members;
   a first suction blocking means for permanently and continuously blocking suction to the article supporting members and positioned within the transfer zone;
   the receiver conveyor comprising:
   a second stationary valve;
   a second rotatable conveyor that is rotatably mounted to the second stationary valve;
   a second plurality of article supporting members spaced apart on the second rotatable conveyor; and
   a second vacuum chamber in communication with the stationary valve, said vacuum chamber being adapted to provide suction to the second plurality of article supporting members;
   an air pulse supply means for selectively injecting a pulse of air into an article supporting member within the transfer zone, said air pulse supply means being responsive to a reject signal;
   the transfer zone comprising upstream and downstream portions;
   wherein the transfer conveyor and receiver conveyor are positioned with respect to each other such that an articles held within the first article supporting members are transferred to the adjacent second article supporting member when the first article-supporting component reaches a transfer point towards the upstream portion of the transfer zone; and
   wherein the air pulse supply means responsive to the reject signal directs an air pulse when the second article supporting member designated by the reject signal reaches a portion of the transfer zone downstream of the transfer point such that the article in the designated second article supporting member is transferred back to a first article supporting member which first article supporting member is downstream of the transfer point.

2. The apparatus of claim 1 wherein the transfer conveyor comprises a processing drum and the receiver conveyor comprises a processing drum.

3. The apparatus of claim 1 wherein:
   the first rotatable conveyor comprises a first plurality of conduits and wherein at least one conduit is in communication with each of the first article supporting members such that the conduit is adapted to transmit vacuum suction from the first vacuum chamber to the first article supporting member; and wherein
   the second rotatable conveyor comprises a second plurality of conduits and wherein at least one conduit is in communication with each of the second article supporting members such that the conduit is adapted to transmit vacuum suction from the second vacuum chamber to the second article supporting member.

4. The apparatus of claim 3 wherein there are two conduits supplying vacuum suction to each of first and second article supporting members.

5. The apparatus of claim 3 wherein each of the first and second article supporting members comprise flutes, said flutes being axially positioned along the periphery of, respectively, the first rotatable conveyor and second rotatable conveyor.

6. The apparatus of claim 1 wherein the articles comprise cigarettes.

7. The apparatus of claim 1 wherein the air pulse supply means is adapted to inject an air pulse of less than 20 psi.

8. The apparatus of claim 1 wherein the air pulse supply means comprises a port and a compressed air conduit connecting the port to an air source.

9. The apparatus of claim 8 wherein the of the compressed air conduit is less than six inches long.

10. The apparatus of claim 1 wherein the first suction blocking means comprises a solid surface.

11. The apparatus of claim 1 wherein the suction blocking means comprises a relief notch that is adapted to provide air at ambient pressure to such first article supporting components as are adjacent to the relief notch.

12. The apparatus of claim 1 wherein the first rotatable conveyor is narrower than the length of the transported articles.

13. The apparatus of claim 12 further comprising a removal means situated downstream of the transfer zone such that it removes from the first rotatable conveyor articles for which transfer is rejected.

14. The apparatus of claim 13 wherein the removal means comprises removal fingers.

15. The apparatus of claim 13 comprising two removal fingers and wherein the removal fingers are generally parallel to each other on opposite sides of the first rotatable conveyor such that the distance between the upstream-most portion of each removal finger and the centerline of the transfer conveyor is less than the shortest distance between the article supporting members and the centerline, and such that the distance between the appendages and the centerline continuously increases in the downstream direction such that it exceeds the distance between the article supporting members and the centerline, thereby stripping an article off its article-supporting component as it moves downstream between the removal fingers.

16. The apparatus of claim 13 wherein the apparatus further comprises a receptacle that is positioned such that it receives articles removed by the removal means.

17. The apparatus of claim 1 wherein the first and second rotatable conveyors are adapted to rotate a speed such that over 5,000 article supporting members pass through the transfer zone each minute.

18. The apparatus of claim 1 wherein the first and second rotatable conveyors are generally cylindrical and the radius of the first rotatable conveyor is greater than the radius of the second transport conveyor.

19. The apparatus of claim 1 wherein said transfer zone is situated in a portion of the rotation of the first rotatable conveyor that is downstream of at least a portion or the first vacuum chamber.

20. A method for selectively rejecting the transfer of discrete articles transferred from a transfer conveyor to a receiver conveyor, said transfer conveyor comprising a first rotatable conveyor and a first plurality of article supporting members spaced apart on the first rotatable conveyor and said receiver conveyor comprising a second rotatable conveyor and a second plurality of article supporting members spaced apart on the second rotatable conveyor, comprising the steps of:
rotating the first and second rotatable conveyors;
providing articles to at least one of the first plurality of article supporting members;
applying suction to those of the first plurality of article supporting members as they rotate on the first rotatable conveyor past a first suction permanently and continuously region of the rotation of the first rotatable conveyor;
blocking suction to the first plurality of article supporting members at a transfer zone downstream of the first suction region;
applying suction to the second plurality of article supporting members as they rotate on the second rotatable conveyor along a second suction region, such that at least a portion of the second suction region is adjacent to the transfer zone;
transferring articles from the upstream-most portion of the transfer zone on the first rotatable conveyor to the second rotatable conveyor; and
transferring selected articles from the second rotatable conveyor to the first rotatable conveyor by a comprising injecting a pulse of air at the selected articles in article supporting members on the second rotatable conveyor in the second suction zone.

21. The method of claim 20 further comprising the step of applying suction to the first plurality of article supporting members downstream of the transfer zone in a third suction region to hold in place the selected articles that were transferred back to the first rotatable conveyor.

22. The method of claim 21 further comprising the step of stripping the selected articles off the first rotatable conveyor in the third suction region.

23. An apparatus for selectively rejecting the transfer of discrete articles from a first conveyor to a second conveyor within a transfer zone, the first and second conveyors being adjacent to each other within the transfer zone, the first conveyor comprising:
a first stationary valve;
a first rotatable conveyor that is rotatably mounted to the first stationary valve;
a first plurality of article supporting members spaced apart on the first rotatable conveyor;
a first suction means for providing suction to the first plurality of article supporting members; and
a first suction blocking means for permanently and continuously blocking suction to the first plurality of article supporting members and positioned within the transfer zone;
the second conveyor comprising:
a second stationary valve;
a second rotatable conveyor that is rotatably mounted to the second stationary valve;
a second plurality of article supporting members spaced apart on the second rotatable conveyor;
a second suction means for providing suction to the second plurality of article supporting members; and
an air pulse supply means for selectively injecting a pulse of air into an article supporting member within the transfer zone, the air pulse supply means being responsive to a reject signal;
wherein transfer of selected articles is rejected by the application of the pulse of air by the air pulse supply means directed downstream of the beginning of the transfer zone.

24. The apparatus of claim 23 wherein the first conveyor comprises a processing drum and the second conveyor comprises a processing drum.

25. The apparatus of claim 24 wherein the of air pulse supply means further comprises a conduit that is less than six inches long from a source of compressed air to a discharge end of the air pulse supply means.

26. The apparatus of claim 24 wherein the first rotatable conveyor is narrower than the length of the transported articles.

27. The apparatus of claim 26 further comprising a removal means situated downstream of the transfer zone such that it removes from the first rotatable conveyor articles for which transfer is rejected.

28. The apparatus of claim 27 wherein the removal means comprises removal fingers.

29. The apparatus of claim 27 comprising two removal fingers and wherein the removal fingers are generally parallel to each other on opposite sides of the first rotatable conveyor such that the distance between the upstream-most portion of each removal finger and the centerline of the first conveyor is less than the shortest distance between the article supporting members and the centerline, and such that the distance between the appendages and the centerline continuously increases in the downstream direction such that it exceeds the distance between the article supporting members and the centerline, thereby stripping an article off its article-supporting component as it moves downstream between the removal fingers.

30. The apparatus of claim 27 wherein the apparatus further comprises a receptacle that is positioned such that it receives articles removed by the removal means.

31. A method for selectively rejecting the transfer of discrete articles from a transfer conveyor to a receiver conveyor, the transfer conveyor comprising a first rotatable conveyor and a first plurality of article supporting members spaced apart on the first rotatable conveyor, and the receiver conveyor comprising a second rotatable conveyor and a second plurality of article supporting members spaced apart on the second rotatable conveyor, comprising the steps of:
rotating the first and second rotatable conveyors;
providing articles to at least one of the first plurality of article supporting members;
applying suction to those of the first plurality of article supporting members as they rotate on the first rotatable conveyor past a first suction region of the rotation of the first rotatable conveyor;
blocking suction to the first plurality of article supporting members at a transfer zone downstream of the first suction permanently and continuously region, allowing the articles to be transferred to the second rotating conveyor in the transfer zone;

rejecting transfer of selected articles from the first rotatable conveyor to the second rotatable conveyor by a injecting a pulse of air that cancels the suction force applied to those of the second plurality of article supporting members that are at the transfer zone and allowing the selected article to be transferred back to the first rotatable conveyor at the downstream-most portion of the transfer zone.

32. The method of claim 31 further comprising the step of applying suction to the first plurality of article supporting members downstream of the transfer zone in a second suction region to hold in place the selected articles for which transfer was inhibited.

33. The method of claim 31 further comprising the step of stripping the selected articles off the first rotatable conveyor in the second suction region.

34. In an apparatus having a first and second article-transporting conveyor, each positioned adjacent to and curved away from the other and each further having a plurality of article-supporting members that hold discrete articles in place by suction, a transfer zone for selectively rejecting transfer of an article from the first conveyor to the second conveyor, responsive to a transfer-reject signal, comprising:

a transfer point at the upstream-most portion of the transfer zone at and after which the suction is permanently and continuously blocked to the article-supporting member on the first conveyor, allowing the article to be transferred to the adjacent article-supporting member on the second conveyor;

a selective-rejection point located downstream of the transfer point and at which an air pulse responsive to the transfer-reject signal is directed and selectively applied to overcome the suction that holds the article in place on the second conveyor, allowing the article to transfer back to the article-supporting member on the first conveyor; and a rejection-receiving point located downstream of the selective-rejection point and at the downstream-most portion of the transfer zone, at and after which the suction returns to the article-supporting member on the first conveyor, and at which the article that is transferred back to received by the article-supporting member on the first conveyor.

* * * * *

UNITED STATES PATENT AND TRADEMARK OFFICE
CERTIFICATE OF CORRECTION

PATENT NO. : 5,232,079
DATED : August 3, 1993
INVENTOR(S) : Marc D. Belcastro et al.

It is certified that error appears in the above-indentified patent and that said Letters Patent is hereby corrected as shown below:

Column 9, line 21, delete "permanently".

Column 9, line 22, delete "and continuously".

Column 9, line 24, insert --permanently and continuously--.

Column 10, line 64, insert --permanently and continuously--.

Col. 10, line 66, delete --permanently and continuously--.

Signed and Sealed this

Fifth Day of July, 1994

Attest:

BRUCE LEHMAN

Attesting Officer     Commissioner of Patents and Trademarks